(Model.)

J. H. HUNTRESS.
WHIFFLETREE HOOK.

No. 258,856. Patented May 30, 1882.

Witnesses:

Inventor:
John H. Huntress

UNITED STATES PATENT OFFICE.

JOHN H. HUNTRESS, OF JANESVILLE, WISCONSIN, ASSIGNOR OF ONE-HALF TO CHARLES DUTTON, OF SAME PLACE.

WHIFFLETREE-HOOK.

SPECIFICATION forming part of Letters Patent No. 258,856, dated May 30, 1882.

Application filed August 4, 1881. (Model.)

*To all whom it may concern:*

Be it known that I, J. H. HUNTRESS, a citizen of the United States, residing at Janesville, in the county of Rock and State of Wisconsin, have invented certain new and useful Improvements in Whiffletree and Trace Hooks, of which the following is a specification.

My invention relates to an improvement in swivel whiffletree and trace hooks, the object being to provide a device of this character which shall be adapted to be locked after the trace is engaged with it; which shall combine simplicity of construction and ease of operation with durability and efficiency in use, and which shall be capable of being manufactured and supplied to the trade at a comparatively light cost.

Figure 1:
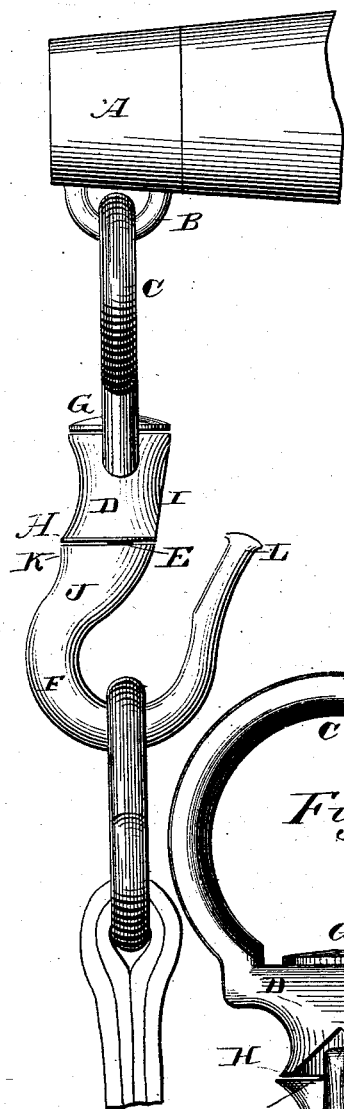
Figure 2:
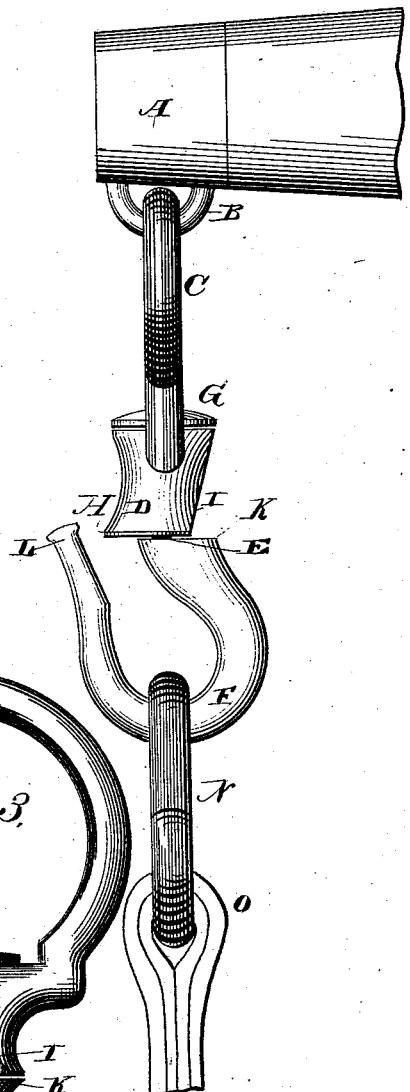

In the accompanying drawings, Figure 1 is a view in side elevation of a swivel whiffletree and trace hook constructed in accordance with my invention, the parts being in the adjustment due to them when the device is unlocked. Fig. 2 is a similar view, showing the hook in its locked adjustment; and Fig. 3 is a view of the hook in front elevation.

A represents the end section of a whiffletree, the same being provided with a staple, B, adapted to be engaged with the ring C, secured to or made integral with the eye D, which receives the stem E of the hook F, the upper end of the stem being provided with a head, G. The said stem fits loosely within the eye to permit the hook to be revolved as desired. The lower edge of the eye is provided with a circumferential shoulder, H, in one side of which a slot, I, is formed. The upper end, J, of the hook is provided with a bearing-face, K, from which the stem E projects, the said stem being located eccentric with the bearing-face and near that edge thereof which faces the outer end, L, of the hook. The object of this arrangement of parts is to provide a suitable bearing for the hook without interfering with the attachment therewith of the ring N of the trace O. When the hook F is turned and its outer end, L, is brought in opposition with the said slot, as shown in Fig. 1 of the drawings, a trace-ring can be readily engaged with the hook. If, now, the hook is turned so that its outer end is carried without the range of the slot, the shoulder H prevents the trace-ring from being disengaged from the hook. Fig. 2 of the drawings represents the hook in this locked adjustment. It is apparent that, although the hook may be very readily manipulated to disengage a trace-ring from it, it is almost impossible for the same to be disengaged without aid.

While the device was primarily designed to be employed as a whiffletree and trace hook, its use is not limited to such capacity, for it may be utilized with good effect in many other ways.

I would also have it understood that I do not limit myself to the exact construction shown and described, but that I hold myself at liberty to make such slight changes and alterations as fairly fall within the spirit and scope of my invention.

Having fully described my invention, what I claim as new, and desire to secure by Letters Patent, is—

1. In a swivel-hook, the combination, with an eye, of a hook eccentrically pivoted to said eye, substantially as set forth.

2. In a swivel-hook, the combination, with an eye formed at its lower edge with a circumferential shoulder cut away at one side, of a hook eccentrically swiveled to said eye, substantially as set forth.

JOHN H. HUNTRESS.

Witnesses:
DANIEL CLORI,
A. D. WICKHAM.